United States Patent Office 3,794,695
Patented Feb. 26, 1974

3,794,695
USE OF β-DICARBONYL COMPOUNDS DERIVED FROM CYCLOPENTANONE AS ADDITIONAL ACCELERATORS FOR POLYESTER MOULDING AND COATING MASSES
Claus Burkhardt, Krefeld, Karl Raichle, Krefeld-Bockum, and Hermann Schnell, Krefeld-Uerdingen, Germany, assignors to Bayer Aktiengesellschaft, Leverkusen, Germany
No Drawing. Continuation-in-part of application Ser. No. 30,335, Apr. 20, 1970. This application Nov. 26, 1971, Ser. No. 202,622
Claims priority, application Germany, May 29, 1969, P 19 27 320.2
Int. Cl. C08f 21/02
U.S. Cl. 260—863                    6 Claims

ABSTRACT OF THE DISCLOSURE

According to the invention hardening of polyester moulding and coating masses of unsaturated polyesters and copolymerizable ethylen compounds containing hydroperoxide catalysts and soluble cobalt accelerators is further accelerated by the addition of small amounts of β-dicarbonyl compounds derived from cyclopentanone.

This application is a continuation in part application of application Ser. No. 30,335, filed Apr. 20, 1970 and now abandoned.

It is known that the hardening of polyester moulding and coating masses consisting of solutions of unsaturated polyesters in copolymerizable monomeric compounds, which is brought about with the use of hydroperoxides as initiators and of cobalt compounds as accelerators at room temperature without external heat supply is additionally acelerated by β-dicarbonyl compounds which in their tautomeric enol form are capable of forming cobalt chelates. The effectiveness of such compounds as additional accelerators is the higher the smaller the amount to be added in order to achieve the maximum acceleration.

Moreover it is desirable, that these polyester moulding and coating masses having incorporated the above mentioned additional accelerators have besides a high reactivity a good storage stability before being hardened.

As β-dicarbonyl compounds there have been proposed, for example, acetoacetic acid ester, acetyl-acetone [Deutsche Farbenzeitschrift 14 (1960), p. 442], acetoacetic acid amides [DAS (German published specification) No. 1,195,491] and 5,5-dimethyl dihydroresorcinol [DAS (German published specification) No. 1,206,584]. In order to achieve sufficiently short hardening times, the hardening brought about with the aforesaid initiator/accelerator system is usually initiated at temperatures of at least +20° C. At lower temperatures, for example, at +10° C. and below, sufficiently short hardening times can no longer be achieved, even with the additional use of β-dicarbonyl compounds.

The β-dicarbonyl compounds mentioned above are especially used as additional accelerators for polyester varnishing materials, since the modern processing on conveyor belts, e.g. with the aid of varnish casting machines, can be carried out the more rapidly, the faster hardening takes place. However, a further increase of the hardening velocity is not possible by means of the β-dicarbonyl compounds hitherto known, if a good storage stability of the polyester materials having incorporated the additional accelerator is to be obtained. Nor do numerous other β-dicarbonyl compounds which have not yet been recommended for the said purpose offer any advantages over the state of the art. Examples of such β-dicarbonyl compounds are benzoyl-acetone, dibenzoyl-methane, 1-[thenoyl-(2′)]-3,3,3-trifluoroacetone, 2-acetyl-cyclohexanone, 2-benzoyl-cyclohexanone, 2-acetyl-cyclododecanone, 3-[4-methylphenyl]-3-ketopropionic acid ethyl ester, 3-[3-methoxyphenyl]-3-ketopropionic acid ethyl ester, 3-ketoglutaric acid diethyl ester, 3-ketoglutaric acid diallyl ester, oxalacetic acid diethyl ester, 2,4,6-trioxoheptane-diacid-1,7-diethyl ester, malonic acid dimethyl ester, acetoacetic acid-tert.-butyl ester, acetoacetic acid-1,3-dichloropropyl-2 ester, acetoacetic acid-2-chloropropyl-1 ester, acetoacetic acid cyclohexyl ester, acetoacetic acid-isopropenyl ester, acetoacetic acid-buten-2-yl-2 ester, acetoacetic acid-n-dodecyl thio-ester, acetoacetic acid phenyl ester, acetoacetic acid-m-cresyl ester, 4-chloro-acetoacetic acid ethyl ester, methylene-bis-acetoacetic ester, 2-ethyl-acetoacetic acid ethyl ester, 2-carbanilido-acetoacetic acid ethyl ester, methane-tricarboxylic acid triethyl ester, stearoylacetoacetic acid ethyl ester, cyclohexanone-2-carboxylic acid methyl ester, cyclohexanone-2-carboxylic acid ethyl ester, cyclohexane-1,4-dione-2,5-dicarboxylic acid diethyl ester, 2-acetylacetoacetic acid anilide, cyclohexanone-2-carboxylic acid-N-propylamide, N-acetoacetylacetamide, N - acetoacetyl urea, N-propionyl-N′-acetoacetyl thiourea, dehydracetic acid, triacetic acid lactone, O-acetoacetyl acetonoxime, O-acetoacetyl butanonoxime and O-acetoacetyl-cyclohexanonoxime.

Surprisingly, it has now been found that certain compounds which are derived from cyclopentanone and are present in a keto-enol equilibrium have a substantially better accelerating effect than all the β-dicarbonyl compounds mentioned above.

The additional accelerators derived from cyclopentanone correspond to the formulae

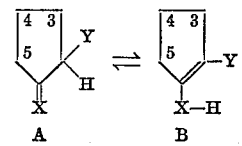

in which X denotes an oxygen atom and Y means an acyl, carboxylic acid ester, or N-substituted or unsubstituted carboxamide group; as acyl group the $C_1$-$C_7$ acyl groups are preferred; the cyclopentanone nucleus may be part of a polycyclic ring system and may contain further substituents in 3, 4 and/or 5 position. The Y-groups are in each case attached via their carbonyl-radical.

These compounds, therefore, occupy a special position. With aid of these compounds the hardening of polyester moulding and coating masses brought about by hydroperoxides and cobalt compounds can be carried out with surprising speed, even at temperatures below +20° C. Especially for the use as coating masses in the varnish technique, the faster hardening has the advantage that wipe-fast surfaces have formed already after a shorter time and that the coated articles can be handled and stacked after a shorter time.

Besides the hardening speed of the polyester moulding and coating masses caused by the additional accelerators of the Formulae AB in the system hydroperoxide/cobalt compounds, the polyester moulding and coating masses having incorporated the additional accelerators of the Formulae AB have the desired high storage stability.

This was surprising in view of the disclosure of the U.S. Pat. 3,347,954 (e.g. Example 12).

The polyester moulding and coating masses having incorporated the additional accelerators of the Formulae AB can be hardened in the initiator/accelerator system hydroperoxide/cobalt compounds within a wide range of temperature. The minimum temperature, which can be used, depends on the consistency of the polyester masses to be hardened, and on the kind of the hardening process.

The subject-matter of the invention, therefore, is the use of the aforesaid compounds of the Formulae AB which are derived from cyclopentanone and are in a keto/enol equilibrium, as additional accelerators for polyester moulding and coating masses which consist of unsaturated polyesters and copolymerizable monomeric compounds and contain hydroperoxides as initiators and soluble cobalt compounds as accelerators.

Additional accelerators of the Formulae AB are fully effective already in amounts of about 0.05 to about 1.5 percent by weight, referred to the polyester masses. The most effective compounds are those in which Y in the above formulae stands for an acyl, carboxamide or nitrile group; they exhibit their maximum effect already when up to about 0.5 percent are added. Higher additions are required if Y denotes a carboxylic acid ester group.

But the moulded parts and coatings from polyester masses hardened by using the nitrile group (Y=nitrile) and/or imino-group (X=imino) containing additional accelerators of the Formulae AB in the initiator/accelerator system of the invention exhibit to greening in a large extent; the moulded parts and coatings from polyester masses hardened by using a carboxamide group (Y=carboxamide, X=oxygen) containing additional accelerator exhibit to discoloration such as yellowing; and, as the carboxylic acid ester groups containing additional accelerators of the Formulae AB (Y=carboxylic acid group, X=oxygen) are, even in threefold amount, less reactive, as already mentioned, than the acyl substituted cyclopentanone compounds (Y=acyl, X=oxygen), the acyl substituted compounds (Y=acyl, X=oxygen) of the Formulae AB are the most preferred additional accelerators in the initiator/accelerator system hydroperoxide/cobalt compounds of the instant invention. Examples for the acyl-substituents are acetyl, propionyl, acryloyl, methacryloyl and butyryl.

The introduction into hardenable polyester masses of the additional accelerators of the Formulae AB according to the invention can be performed immediately after their manufacture without causing premature gelling of the polyester masses or any impairment to their stability in storage. However, the additional accelerators also develop their full effect if they are added to the polyester masses immediately prior to their processing. The polymerization of the polyester masses containing the additional accelerators according to the invention can be initiated in such a way that radicals are produced by intermixture of hydroperoxide initiators and soluble cobalt accelerators. As disclosed in the DAS 1,252,414, polymerization can also be initiated by addition of hardening mixtures consisting of peroxide initiators and the additional accelerators according to the invention to the unsaturated polyester masses, which contain in addition cobalt compounds.

To prepare cross-linked polyester coatings, a procedure can be used wherein the polyester varnish solution containing the cobalt accelerator and the additional accelerators of the invention is applied to a catalyst primer containing the peroxide initiator. A cross-linked polyester coating can also be produced in that a peroxide-containing and a cobalt-containing polyester varnishing layer are each coated on top of each other in a wet state, polymerization being initiated by the mutual diffusion of both varnishing layers. Using this process the additional accelerators of the invention can be put in the peroxide or in the cobalt varnishing or in both varnishing components.

The additional accelerators of Formulae AB may also be added to the hardenable polyester masses as metal chelates especially as cobalt chelates. The excellent accelerating action of the additional accelerators according to the invention can be exploited in the presence of heat, e.g. in the presence of IR rays.

In general, the additional accelerators according to the invention are well compatible with the polyester masses and additional solvents are therefore not required. Because of the good compatibility and of the low concentrations required to achieve the maximum effect, the undesirable side-effects which, as is known, may be caused by the addition of noncopolymerizable compounds to the polyester masses are largely excluded by the use of the additional accelerators according to the invention. Such side-effects may consist, for example, in a partial swelling or partial dissolving of the varnish foundation when polyester coatings are produced; they are observed e.g. in the case where acetoacetic ester is used, the maximum effect of which is reached only with the addition of amounts of 3–5 percent by weight, or also with other additional accelerators which are effective but sparingly soluble, such as 5,5-dimethyl dihydroresorcinol, and can only be homogeneously incorporated in the polyester masses with the additional use of solubilizing compounds.

The additional accelerators according to the invention can also be used in mixture with one another or in combination with additional accelerators of a different type. As usual the masses contain inhibitors in the usual amounts. The masses may further contain conventional additives such as fillers, thickening agents, pigments, paraffin and/or anti-greening agents.

Examples of additional accelerators of Formulae AB are 2-acetyl-cyclopentanone,
2-propionyl-cyclopentanone,
2-[3-chloropropionyl]-cyclopentanone,
2-methacryloyl-cyclopentanone,
2-isovalerianoyl-cyclopentanone,
2-formyl-cyclopentanone,
2,5-diacetylcyclopentanone,
2,5-dipropionyl-cyclopentanone,
2-benzoyl-cyclopentanone,
2-acetyl-indanone-1,
3-acetyl camphor,
cyclopentanone-2-carboxylic acid methyl ester,
cyclopentanone-2-carboxylic acid ethyl ester,
cyclopentanone-2-carboxylic acid allyl ester,
cyclopentanone-2-carboxylic acid-N-propylamide,
cyclopentanone-2-carboxylic acid-N-cyclohexylamide,
cyclopentanone-2-carboxylic acid-N-[methoxymethyl]-amide,
cyclopentanone-2-carboxylic acid-anilide,
di-[cyclopentanone-2-carboxylic acid]-hexamethylene-1,6-diamide,
cyclopentanone-2-thiocarboxylic acid-anilide.

The additional accelerators of the Formulae AB can be prepared by methods known from the literature, for example, by reacting cyclopentenyl-enamines with suitable acyl halides, chloroformic acid esters, isocyanates or isothiocyanates [Chem. Berichte, vol. 95 (1962), p. 926, where further literature references are given].

The imino group (X=imino) containing compounds of the Formulae AB can be obtained in known manner by reacting the corresponding keto compounds with ammonia.

As is usual for polyester moulding and coating masses, the term unsaturated polyesters refers to polyesters with a content of ethylenically $\alpha,\beta$-unsaturated dicarboxylic acid radicals, which are usually obtained by polycondensation of $\alpha,\beta$-unsaturated dicarboxylic acids, such as maleic acid, fumaric acid, citraconic acid and itaconic acid or their anhydrides, with polyalcohols, such as ethylene glycol, diethylene glycol, propane-diol, butane-diol, butene-diol, neopentyl glycol, hexane-diol, trimethylolpropane and pentaerythritol. Part of the $\alpha,\beta$-unsaturated dicarboxylic acids may be replaced with other polybasic carboxylic acids, e.g. succinic acid, adipic acid, sebacic acid, dimerized fatty acids, phthalic acid, isophthalic acid, terephthalic acid, tetrahydrophthalic acid, tetrachlorophthalic acid, hexachloro-endomethylene-tetrahydrophthalic acid and trimellitic acid. Modifications by the incorporation of monohydric alcohols, such as butanol and tetrahydrofurfuryl alcohol, and of monobasic carboxylic acids, such as benzoic acid, tert.-butyl-benzoic acid, oleic acid, linseed fatty acid and abietic acid, are also possible. Unsaturated polyesters containing, according to DAS (German published specification) No. 1,024,654, $\beta,\gamma$-unsaturated ether radicals, besides the radicals of $\alpha,\beta$-dicarboxylic acids, must also be mentioned.

Examples of monomeric compounds which can be copolymerized with the unsaturated polyesters are vinyl, acrylo, methacrylo and allyl compounds, such as styrene, vinyl-toluene, divinyl-benzene, vinyl acetate, vinyl propionate, adipic acid divinyl ester, esters and amides of acrylic and methacrylic acid, such as the methyl-, ethyl-, hydroxyethyl- and hydroxypropyl-ester of acrylic and methacrylic acid, acrylonitrile, diallyl phthalate, diallyl maleinate and triallyl cyanurate.

In order to increase the stability in storage, the polyester moulding and coating masses contain the usual inhibitors, such as hydroquinone, toluhydroquinone, tert.-butyl-pyrocatechol, p-benzoquinone, and copper compounds, e.g. Cu-naphthenate.

Suitable peroxide initiators are the hydroperoxides commonly used, for example, cumol hydroperoxide, but preferably ketone hydroperoxides, such as cyclohexanone hydroperoxide, methyl ethyl ketone hydroperoxide, methyl isobutyl ketone hydroperoxide and acetyl-acetone hydroperoxide.

Suitable cobalt accelerators are cobalt compounds which are soluble in the polyester masses, for example, the salts of higher carboxylic acids, such as cobalt octoate, cobalt naphthenate, cobalt resinate and cobalt linoleate; furthermore, the cobalt salts of dicarboxylic acid semiesters and compounds with chelate-like bound cobalt of the type of cobalt acetoacetic ester and cobalt acetylacetonate. Cobalt chelates of the additional accelerators according to the invention, e.g. of 2-acetyl-cyclopentanone and cyclopentanone-2-carboxylic acid methyl ester, may also be used.

Other soluble cobalt compounds, are mentioned for example in the British Pat. 801,795.

The parts and percentages given in the following examples are parts by weight and percent by weight.

The polyester masses used for carrying out the examples have the following composition:

Polyester mass (A)

55 parts of an unsaturated polyester prepared from
    608 parts maleic acid anhydride
    562 parts phthalic acid anhydride
    790 parts propane-diol-1,2
    Acid number (DIN 53 402) 46
    Viscosity, 65% in styrene at 20° C. (DIN 53 015), 1486 cp.
45 parts styrene
0.012 part toluhydroquinone Polyester mass (B)

55 parts of an unsaturated polyester prepared from
    295 parts maleic acid anhydride
    1035 parts phthalic acid anhydride
    760 parts propandiol-1,2
    Acid number (DIN 53 402) 45
    Viscosity, 65% in styrene at 20° C. (DIN 53 015), 1760 cp.
45 parts styrene
0.012 part toluhydroquinone Polyester mass (C)

55 parts of an unsaturated polyester, prepared from
    684 parts maleic acid anhydride
    445 parts phthalic acid anhydride
    910 parts butane-diol-1,3
    Acid number (DIN 53 402) 36
    Viscosity, 65% in styrene at 20° C. (DIN 53 015), 1795 cp.
45 parts styrene
0.012 part toluhydroquinone

EXAMPLE 1

Portions of 10 parts of the polyester mass (A) are admixed in test tubes of 18 mm. diameter with the additional accelerators mentioned in the Table 1 as well as with 0.4 part of a 50% solution of cyclohexanone hydroperoxide in dimethyl phthalate, and the mixtures are heated in a first test series to +20° C. and in a second series to +10° C. by introducing them into thermostats kept at a constant temperature. Subsequently, all the samples are mixed with 0.003 part of cobalt in the form of a 20% solution of cobalt naphthenate in toluene, and the gelling times at the stated temperatures are determined. The gelling times at +20° C. and at +10° C. as well as the difference between these values are stated in Table 1. The experiments with additional accelerators according to the invention are assembled in part (a); part (b) contains comparative experiments with the use of other $\beta$-dicarbonyl compounds as additional accelerators.

TABLE 1

|  | Percent | Gelling time, min. at +20° C. | Gelling time, min. at +10° C. | Difference, min. |
|---|---|---|---|---|
| (a) Additional accelerators according to the invention: | | | | |
| 2-acetyl-cyclopentanone | 0.3 | 2.0 | 4.0 | 2.0 |
| Do | 0.5 | 2.0 | 4.0 | 2.0 |
| 2-propionyl-cyclopentanone | 0.3 | 2.0 | 4.0 | 2.0 |
| Do | 0.5 | 2.0 | 3.5 | 1.5 |
| Cyclopentanone-2-carboxylic acid methyl ester | 0.5 | 4.0 | 7.5 | 3.5 |
| Do | 1.2 | 3.0 | 6.0 | 3.0 |
| Cyclopentanone-2-carboxylic acid-N-propylamide | 0.5 | 3.0 | 5.5 | 2.5 |
| 2-cyano-cyclopentanone-imine | 0.4 | 1.25 | 3.0 | 1.75 |
| (b) Other additional accelerators (comparative experiments): | | | | |
| No additive (Standard) | | 8.5 | 26.0 | 17.5 |
| Acetyl-acetone | 0.25 | 4.0 | 10.0 | 6.0 |
| Do | 0.5 | 3.5 | 11.0 | 7.5 |
| 2-acetyl-cyclohexanone | 0.3 | 6.5 | 18.5 | 12.0 |
| Do | 0.5 | 6.0 | 15.0 | 9.0 |
| 2-acetyl-cyclododecanone | 0.5 | 6.5 | 16.5 | 10.0 |
| 5,5-dimethyl dihydroresorcinol [1] | 0.4 | 4.5 | 15.0 | 10.5 |
| Acetoacetic acid ethyl ester | 0.4 | 8.0 | 20.0 | 12.0 |
| Do | 2.5 | 6.0 | 15.0 | 9.0 |
| Do | 5.0 | 5.0 | 13.0 | 8.0 |
| Cyclohexanone-2-carboxylic acid ethyl ester | 0.5 | 6.5 | 16.0 | 9.5 |
| Do | 0.3 | 7.0 | 18.0 | 11.0 |
| Acetoacetic acid-p-toluidide | 0.3 | 4.5 | 12.5 | 8.0 |
| Do | 0.4 | 4.0 | 11.5 | 7.5 |
| Acetoacetic acid-piperidide | 0.3 | 4.5 | 12.0 | 7.5 |
| Do | 0.5 | 4.0 | 10.0 | 6.0 |

[1] In the form of a 10% solution in n-butanol.

In the following Examples 2 to 5 the polyester masses are admixed each time with 0.1 part of paraffin in the form of a 10% solution in toluene. Working up of the polyester coating masses takes place in these examples at between 20 and 24° C.

EXAMPLE 2

Portions of 100 parts of the polyester mass (A) are admixed with the additional accelerators mentioned in the Table 2 and with the hydroperoxides stated in the last column of the table. All the samples are subsequently admixed with 0.03 part of cobalt in the form of a 20% solution of cobalt naphthenate in toluene, and these mixtures are immediately applied to a primed wood substrate in a wet film layer of about 500μ thickness by means of a film drawing apparatus. The time which elapses after addition of the cobalt until a wipe-fast paraffin finish has formed is measured as the drying time.

The Table 2 contains a part (a) the drying times of the films prepared with the aid of the additional accelerators according to the invention; the comparative experiments with the use of other β-dicarbonyl compounds as additional accelerators are assembled in part (b).

TABLE 3

| | Percent | Drying time, min. |
|---|---|---|
| (a) Addition accelerators according to the invention: | | |
| 2-acetyl-cyclopentanone | 0.25 | 24 |
| Do | 0.4 | 20 |
| 2-propionyl-cyclopentanone | 0.25 | 23 |
| 2-acetyl-indanone | 0.4 | 22 |
| 2-cyano-cyclopentanone-imine | 0.4 | 20 |
| (b) Other additional accelerators (comparative experiments): | | |
| No additive | | 70 |
| 5,5-dimethyl dihydroresorcinol [1] | 0.3 | 48 |
| Do.[1] | 0.5 | 40 |
| 2-acetyl-cyclohexanone | 0.25 | 49 |
| Do | 0.42 | 38 |
| Acetoacetic ester | 0.5 | 60 |
| Do | 5.0 | 45 |
| Acetoacetic acid piperidide | 0.25 | 40 |
| Do | 0.5 | 30 |
| Acetoacetic acid benzylamide | 0.4 | 45 |

[1] In the form of a 10% solution in n-butanol.

TABLE 2

| | Percent | Peroxide added | Percent | Drying time, min. |
|---|---|---|---|---|
| (a) Additional accelerators according to the invention: | | | | |
| 2-acetyl-cyclopentanone | 0.2 | Cyclohexanone hydroperoxide [1] | 4.0 | 20 |
| Do | 0.3 | do.[1] | 4.0 | 17 |
| Do | 0.5 | do.[1] | 4.0 | 18 |
| Do | 0.5 | Methyl ethyl ketone hydroperoxide [2] | 2.7 | 18 |
| Do | 0.5 | Acetylacetone hydroperoxide [3] | 6.5 | 19 |
| 2-propionyl-cyclopentanone | 0.25 | Cyclohexanone hydroperoxide [1] | 4.0 | 17 |
| Do | 0.42 | do.[1] | 4.0 | 17 |
| 2-acetyl-indanone | 0.5 | do.[1] | 4.0 | 19 |
| Cyclopentanone-2-carboxylic acid-N-propylamide | 0.4 | do.[1] | 4.0 | 21 |
| Do | 1.0 | do.[1] | 4.0 | 18 |
| 2-cyano-cyclopentanoneimine | 0.4 | do.[1] | 4.0 | 13 |
| (b) Other additional accelerators (comparative experiments): | | | | |
| No additive (Standard) | | do.[1] | 4.0 | 45 |
| Do | | Methyl ethyl ketone hydroperoxide [2] | 3.0 | 35 |
| Do | | Acetylacetone hydroperoxide [3] | 6.5 | 48 |
| Acetoacetic ester | 0.5 | Cyclohexanone hydroperoxide [1] | 4.0 | 45 |
| Do | 3.0 | do.[1] | 4.0 | 40 |
| Do | 5.0 | do.[1] | 4.0 | 40 |
| Acetylacetone | 0.25 | do.[1] | 4.0 | 43 |
| Do | 0.42 | do.[1] | 4.0 | 38 |
| Benzoylacetone | 0.3 | do.[1] | 4.0 | 45 |
| 5,5-dimethyl dihydroresorcinol [4] | 0.42 | do.[1] | 4.0 | 29 |
| 2-acetyl-cyclohexanone | 0.5 | do.[1] | 4.0 | 40 |
| 2-benzoyl-cyclohexanone | 0.8 | do.[1] | 4.0 | 50 |
| 2-acetyl-cyclododecanone | 0.7 | do.[1] | 4.0 | 45 |
| Acetoacetic acid piperidide | 0.25 | do.[1] | 4.0 | 35 |
| Do | 0.42 | do.[1] | 4.0 | 30 |
| Do | 1.0 | do.[1] | 4.0 | 28 |
| Do | 0.5 | Methyl ethyl ketone hydroperoxide [2] | 3.0 | 29 |
| Acetoacetic acid piperidide | 0.5 | Acetylacetone hydroperoxide [3] | 6.5 | 29 |
| Acetoacetic acid-p-toluidide | 0.42 | Cyclohexanone hydroperoxide [1] | 4.0 | 32 |
| Cyclohexanone-2-carboxylic acid ethyl ester | 0.5 | do.[1] | 4.0 | 40 |
| Cyclohexanone-2-carboxylic acid-N-propylamide | 0.5 | do.[1] | 4.0 | 45 |

[1] 50% in dimethyl phthalate.
[2] 40% in dimethyl phthalate.
[3] 40% in dimethyl phthalate.
[4] In the form of a 10% solution in n-butanol.

EXAMPLE 3

Portions of 100 parts of the polyester mass (B) are admixed with the additional accelerators indicated in the Table 3 and with 4 parts of a 50% solution of cyclohexanone hydroperoxide in dimethyl phthalate. All the samples are subsequently admixed with 0.03 part of cobalt in the form of a 20% solution of cobalt naphthenate in toluene, and the mixtures are immediately applied to a primed wood substrate in a wet film layer of about 500μ thickness by means of a film drawing apparatus.

The Table 3 contains in part (a) the drying times of the films produced with the use of the additional accelerators according to the invention; comparative experiments with the use of other β-dicarbonyl compounds as additional accelerators are assembled in part (b).

EXAMPLE 4

Portions of 100 parts of the polyester mass (C) are admixed with the additional accelerators mentioned in the Table 4 and with 4 parts of a 50% solution of cyclohexanone peroxide in dimethyl phthalate. All the samples are subsequently admixed with 0.03 part of cobalt in the form of a 20% solution of cobalt naphthenate in toluene, and the mixtures are immediately applied to a primed wood substrate in a wet film layer of about 500μ thickness with the aid of a film drawing apparatus.

The Table 4 contains in part (a) the drying times of the films produced with the use of the additional accelerators according to the invention; part (b) contains the comparative experiments with the use of other β-dicarbonyl compounds as additional accelerators.

TABLE 4

| | Percent | Drying time, min. |
|---|---|---|
| (a) Additional accelerators according to the invention: | | |
| 2-acetyl-cyclopentanone | 0.25 | 20 |
| Do | 0.4 | 15 |
| 2-propionyl-cyclopentanone | 0.3 | 22 |
| Do | 0.5 | 14 |
| 2-acetyl-indanone | 0.4 | 20 |
| 2-cyano-cyclopentanone-imine | 0.4 | 15 |
| Cyclopentanone-2-carboxylic acid methyl ester | 1.0 | 24 |
| (b) Other additional accelerators (comparative experiments): | | |
| No additive | | 65 |
| 2-acetyl-cyclohexanone | 0.3 | 38 |
| Do | 0.5 | 33 |
| Acetylacetone | 0.3 | 50 |
| Do | 0.5 | 55 |
| Acetoacetic ester | 0.5 | 55 |
| Do | 4.0 | 35 |
| Acetoacetic acid benzylamide | 0.5 | 30 |
| Acetoacetic acid piperidide | 0.25 | 28 |
| Do | 0.5 | 28 |

EXAMPLE 5

Portions of 100 parts of the polyester mass (A) are admixed with the additional accelerators mentioned in the Table 5 and with 0.03 part of cobalt in the form of a 20% solution of cobalt naphthenate in toluene, and each of the mixtures is applied in a wet film layer of about 500μ thickness to a wood veneer coated with 100 g./sq. m. of a catalyst primer.

The catalyst primer was prepared by applying a solution of 30 parts nitrocellulose (butanol-moist) in 120 parts ethyl acetate and 35 parts butyl acetate as well as 20 parts cyclohexanone hydroperoxide powder (95%).

The time elapsing after application of the film to the catalyst primer until a wipe-fast paraffin finish has formed is measured as the drying time.

The Table 5 contains in part (a) the drying times of the films produced with the use of the additional accelerators according to the invention; part (b) contains comparative experiments with the use of other β-dicarbonyl compounds as additional accelerators.

TABLE 5

| | Percent | Drying time, min. |
|---|---|---|
| (a) Additional accelerators according to the invention: | | |
| 2-acetyl-cyclopentanone | 0.3 | 19 |
| Do | 0.5 | 18 |
| 2-propionyl-cyclopentanone | 0.3 | 20 |
| Do | 0.5 | 15 |
| Cyclopentanone-2-carboxylic acid-N-propylamide | 0.5 | 20 |
| 2-cyano-cyclopentanone-imine | 0.4 | 13 |
| (b) Other additional additives (comparative experiments): | | |
| No additive | | 50 |
| Acetyl-acetone | 0.25 | 38 |
| Do | 0.42 | 32 |
| 2-acetyl-cyclohexanone | 0.3 | 40 |
| Do | 0.5 | 35 |
| Acetoacetic ester | 0.5 | 42 |
| Do | 5.0 | 33 |
| Acetoacetic acid piperidide | 0.3 | 35 |
| Do | 0.42 | 29 |
| Acetoacetic acid-p-toluidide | 0.3 | 37 |
| Do | 0.42 | 30 |
| Cyclohexanone-2-carboxylic acid-N-propylamide | 0.5 | 45 |

What we claim is:

1. A polyester moulding and coating mass comprising an unsaturated polyester of a dicarboxylic acid and a polyol, a copolymerizable monomeric compound, a ketone hydroxide as initiator, a soluble cobalt compound as accelerator and, as an additional accelerator, at least about 0.05% by weight, based on the weight of said polyester mass, of a compound derived from cyclopentanone which is in a keto/enol equilibrium corresponding to the formulae:

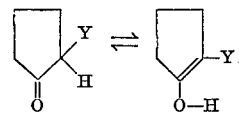

wherein Y is acetyl, propionyl, butyryl, acryloyl or methacryloyl.

2. The polyester moulding and coating mass of claim 1 containing from 0.05 to 1.5% by weight of said additional accelerator.

3. The polyester moulding and coating mass of claim 1 containing from 0.05 to 0.5% by weight of said additional accelerator.

4. The polyester moulding and coating mass of claim 1 wherein Y is acetyl.

5. A polyester moulding and coating mass comprising an unsaturated polyester of a dicarboxylic acid and a polyol, a copolymerizable monomeric compound, a soluble cobalt compound as accelerator and, as an additional accelerator, at least about 0.05% by weight, based on the weight of said polyester mass, of a compound derived from cyclopentanone which is in a keto/enol equilibrium corresponding to the formulae:

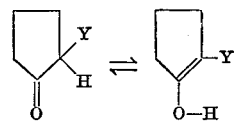

wherein Y is acetyl, propionyl, butyryl, acryloyl or methacryloyl.

6. The polyester moulding and coating mass of claim 5 wherein Y is acetyl.

References Cited

UNITED STATES PATENTS

| 3,347,954 | 10/1967 | Bredereck et al. | 260—864 |
| 3,398,213 | 8/1968 | Chatakian | 260—863 |

FOREIGN PATENTS

| 1,206,584 | 12/1965 | Germany. |

MELVIN GOLDSTEIN, Primary Examiner

UNITED STATES PATENT OFFICE
CERTIFICATE OF CORRECTION

Patent No. 3,794,695                              Dated February 26, 1974

Inventor(s) Claus Burkhardt et al

It is certified that error appears in the above-identified patent and that said Letters Patent are hereby corrected as shown below:

Cols. 5 and 6, line 58, "(2) Additional" should read -- (a) Additional --.

Col. 9, line 18, "28" (next to the last entry in the drying time tabulation) should read -- 40 --.

Signed and sealed this 13th day of August 1974.

(SEAL)
Attest:

McCOY M. GIBSON, JR.                C. MARSHALL DANN
Attesting Officer                   Commissioner of Patents